(12) United States Patent
Kupferman

(10) Patent No.: US 7,715,138 B1
(45) Date of Patent: May 11, 2010

(54) DISK DRIVE ESTIMATING A SERVO ZONE AFTER SYNCHRONOUSLY DETECTING A SERVO SYNC MARK

(75) Inventor: Hanan Kupferman, Diamond Bar, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 371 days.

(21) Appl. No.: 11/943,457

(22) Filed: Nov. 20, 2007

(51) Int. Cl.
*G11B 5/09* (2006.01)

(52) U.S. Cl. .................................................. 360/51

(58) Field of Classification Search .................. 360/51, 360/29, 30, 39, 75, 77.08, 48, 46, 316
See application file for complete search history.

(56) References Cited

U.S. PATENT DOCUMENTS

| | | | | |
|---|---|---|---|---|
| 5,420,730 A | * | 5/1995 | Moon et al. | 360/77.08 |
| 5,475,540 A | * | 12/1995 | Gold | 360/48 |
| 5,602,693 A | * | 2/1997 | Brunnett et al. | 360/77.08 |
| 5,726,818 A | * | 3/1998 | Reed et al. | 360/51 |
| 5,796,535 A | * | 8/1998 | Tuttle et al. | 360/51 |
| 5,812,336 A | * | 9/1998 | Spurbeck et al. | 360/51 |
| 5,825,568 A | * | 10/1998 | Lee | 360/51 |
| 5,956,196 A | | 9/1999 | Hull et al. | |
| 5,966,258 A | * | 10/1999 | Bliss | 360/46 |
| 6,084,738 A | | 7/2000 | Duffy | |
| 6,118,604 A | | 9/2000 | Duffy | |
| 6,157,604 A | | 12/2000 | Feyh et al. | |
| 6,262,857 B1 | * | 7/2001 | Hull et al. | 360/51 |
| 6,388,829 B1 | * | 5/2002 | Nazarian | 360/48 |
| 6,411,452 B1 | | 6/2002 | Cloke | |
| 6,441,452 B2 | * | 8/2002 | Yin | 257/437 |
| 6,441,981 B1 | | 8/2002 | Cloke et al. | |
| 6,646,822 B1 | * | 11/2003 | Tuttle et al. | 360/46 |
| 6,654,195 B1 | * | 11/2003 | Frank et al. | 360/75 |
| 6,995,941 B1 | * | 2/2006 | Miyamura et al. | 360/75 |
| 7,012,773 B2 | | 3/2006 | Ashikaga et al. | |
| 7,054,083 B2 | | 5/2006 | Ehrlich | |
| 7,110,208 B1 | * | 9/2006 | Miyamura et al. | 360/77.08 |
| 7,145,743 B2 | * | 12/2006 | Park et al. | 360/75 |
| 7,333,290 B1 | * | 2/2008 | Kupferman | 360/77.08 |
| 7,564,656 B2 | * | 7/2009 | Gurney et al. | 360/316 |
| 2008/0180826 A1 | * | 7/2008 | Cho | 360/48 |

* cited by examiner

*Primary Examiner*—Fred Tzeng

(57) ABSTRACT

A disk drive is disclosed comprising a disk having a plurality of servo sectors defining a plurality of servo tracks that form a plurality of servo zones. The disk drive further comprises a head actuated radially over the disk for generating a read signal, and control circuitry including a timing circuit. The timing circuit is initialized with a nominal center frequency that approximates an average servo data rate out of the plurality of servo zones. The timing circuit is synchronized to the read signal to generate synchronous read signal samples. A servo sync mark is detected from the synchronous read signal samples, and the servo zone the head is reading is estimated after detecting the servo sync mark.

19 Claims, 6 Drawing Sheets

DISK DRIVE ESTIMATING A SERVO ZONE AFTER SYNCHRONOUSLY DETECTING A SERVO SYNC MARK

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

Because the disk is rotated at a constant angular velocity, the user data rate is typically increased toward the outer diameter tracks (where the surface of the disk is spinning faster) in order to achieve a more constant linear bit density across the radius of the disk. To simplify design considerations, the data tracks are typically banded together into a number of physical zones, wherein the user data rate is constant across a zone, and increased from the inner diameter zones to the outer diameter zones. This is illustrated in FIG. 1, which shows a prior art disk format 2 comprising a number of data tracks 4, wherein the data tracks are banded together in this example to form three physical zones from the inner diameter of the disk (ZONE 1) to the outer diameter of the disk (ZONE 3).

The prior art disk format of FIG. 1 also comprises a number of servo sectors $6_0$-$6_N$ recorded around the circumference of each data track. Each servo sector 6, may comprise a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector 6, may further comprise groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

The servo sectors $6_0$-$6_N$ are typically recorded at a constant data rate from the inner to outer diameter of the disk 2, such that the servo sectors $6_0$-$6_N$ are said to form servo wedges across the radius of the disk 2 as shown in FIG. 1. However, recording the servo data at a constant data rate across the disk radius may be undesirable because it reduces the format efficiency, particularly at the outer diameter data tracks. In addition, the data rate may affect the ability to read the servo data reliably, depending on the radial location of the head and the corresponding velocity of the servo track. In other words, the servo data may be read more reliably if the servo data rate is optimized relative to the radial location of the servo track. However, varying the servo data rate across the disk radius complicates the servo system, and in particular, the timing recovery system which attempts to synchronize to the servo sectors as well as maintain a servo timing window for activating a servo gate as the head approaches a servo sector.

There is, therefore, a need for a disk drive comprising a timing recovery system that enables the servo data rate to vary across the radius of the disk.

DETAILED DESCRIPTION OF EMBODIMENTS OF THE INVENTION

Figure 1:
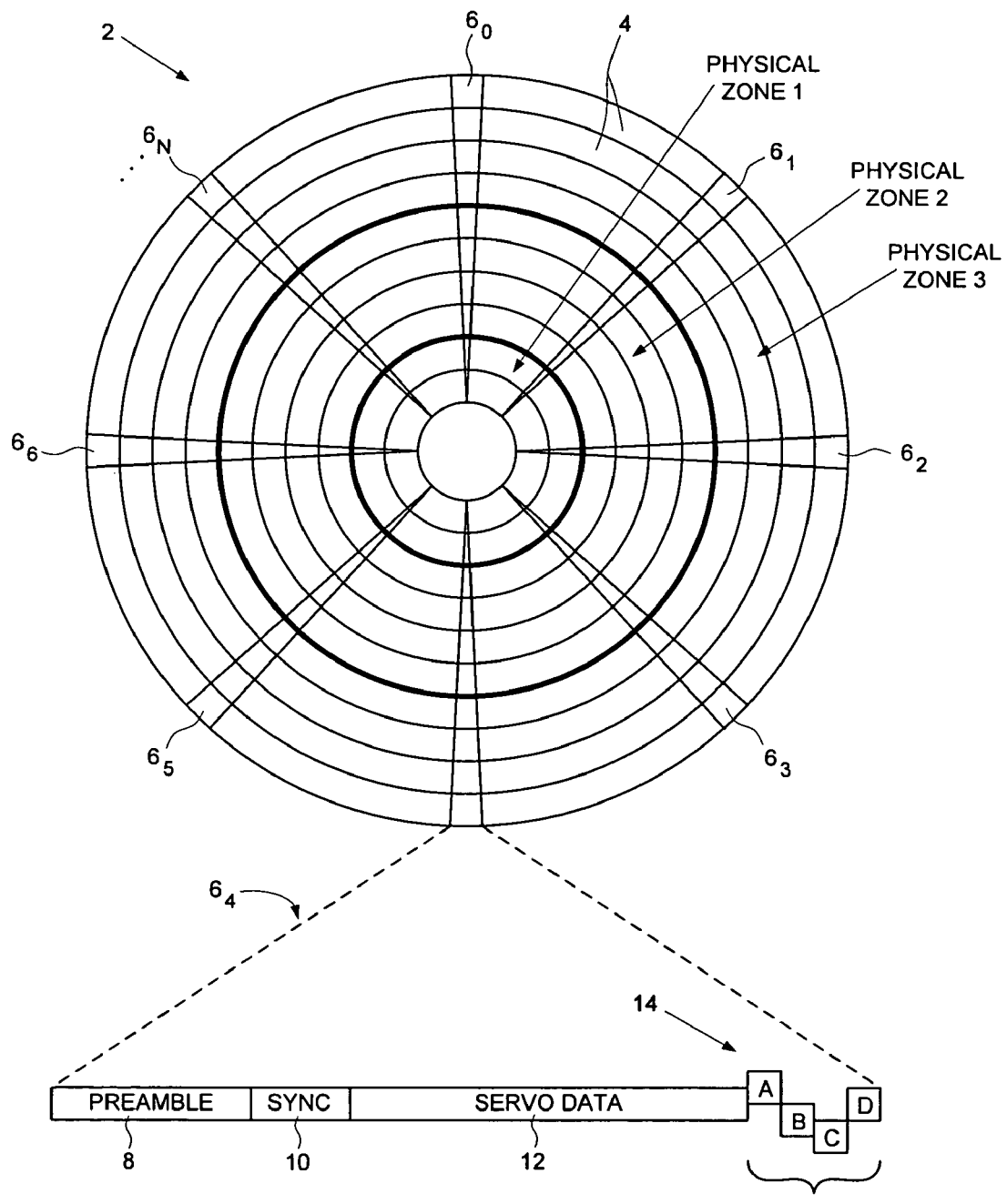
FIG. 1 shows a prior art disk format comprising a plurality of data tracks banded together to form a plurality of physical zones, wherein each data track comprises a plurality of data sectors and embedded servo sectors.
Figure 2A:
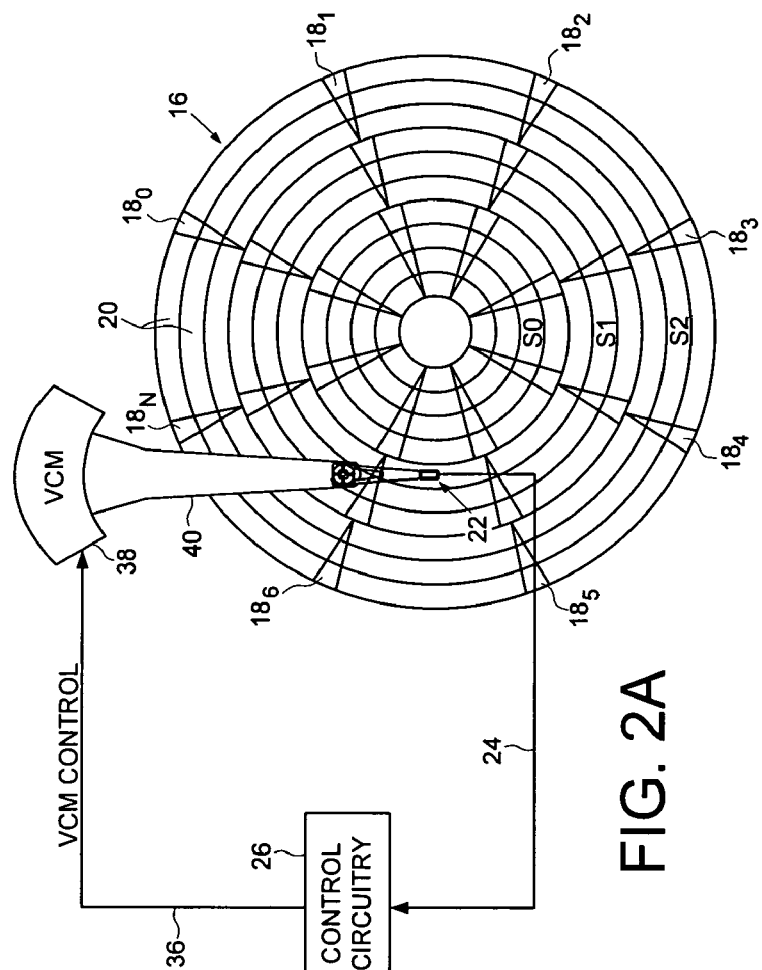
FIG. 2A shows a disk drive according to an embodiment of the present invention comprising a disk having servo zones, a head actuated over the disk, and control circuitry.

FIG. 2A shows a disk drive according to an embodiment of the present invention comprising a disk 16 having a plurality of servo sectors $18_0$-$18_N$ defining a plurality of servo tracks 20. Each servo sector 18, may comprise a servo sync mark. The servo tracks 20 form a plurality of servo zones (e.g., S0, S1, S2) and a servo data rate of the servo sectors in a first servo zone is different than a servo data rate of the servo sectors in a second servo zone. The disk drive further comprises a head 22 actuated radially over the disk 16 for generating a read signal 24, and control circuitry 26 including a timing circuit (T.C.). The control circuitry 26 executes the flow diagram of FIG. 2B in order to estimate the servo zone the head 22 is reading. The timing circuit is initialized with a nominal center frequency that approximates an average servo data rate out of the plurality of servo zones (step 28). The timing circuit is synchronized to the read signal to generate synchronous read signal samples (step 30). A first one of the servo sync marks is detected from the synchronous read signal samples (step 32), and the servo zone the head is reading is estimated after detecting the first servo sync mark (step 34).

In the embodiment of FIG. 2A, the control circuitry 26 processes the read signal 24 emanating from the head 22 to demodulate the embedded servo sectors $18_0$-$18_N$ and generate a position error signal (PES) representing a radial offset of the head 22 from a target track 20. The control circuitry 26 processes the PES with a suitable servo compensator to generate a control signal 36 applied to a voice coil motor (VCM) 38. The VCM 38 rotates an actuator arm 40 about a pivot in order to actuate the head 22 radially over the disk 16 in a direction that decreases the PES.

Figure 2B:
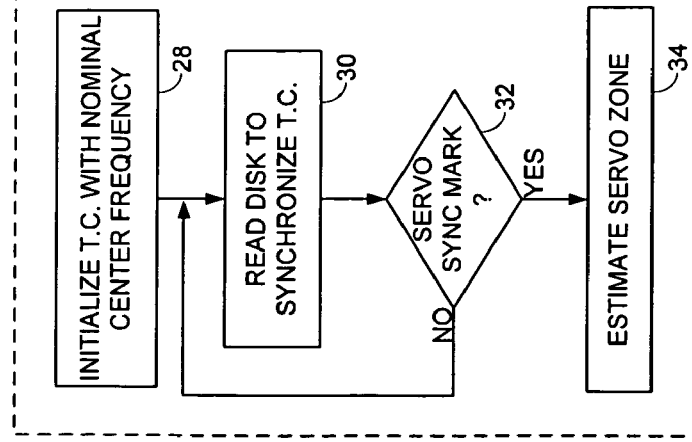
FIG. 2B is a flow diagram executed by the control circuitry for estimating the servo zone of the head according to an embodiment of the present invention.
Figure 3:
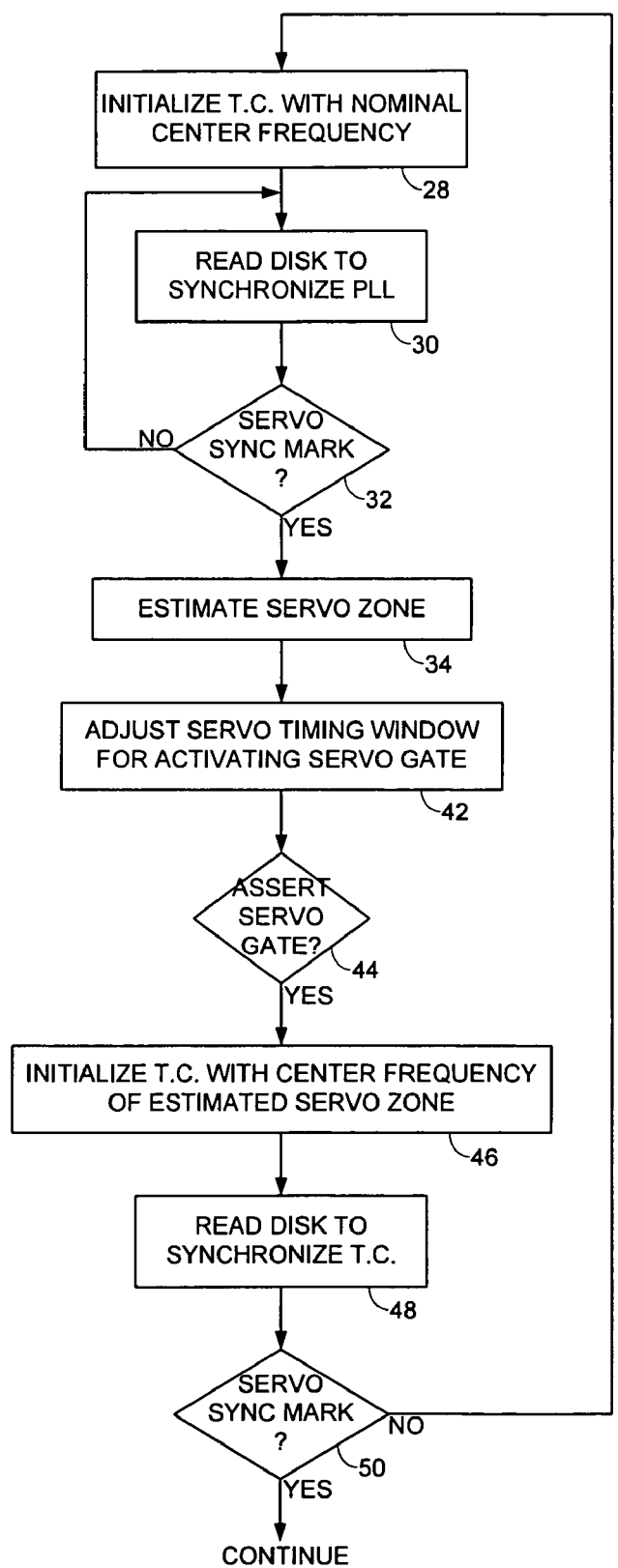
FIG. 3 is a flow diagram executed by the control circuitry wherein after estimating the servo zone a timing circuit is initialized with a center frequency corresponding to the estimated servo zone prior to reading the next servo sector according to an embodiment of the present invention.

FIG. 3 is a flow diagram that extends the flow diagram of FIG. 2B according to an embodiment of the present invention. After estimating the servo zone (step 34), a servo timing window is adjusted (step 42), wherein the servo timing window is for activating a servo gate as the head approaches one of the servo sectors. When the servo gate is activated (step 44), the timing circuit is initialized with a center frequency that corresponds to the estimated servo zone. The timing circuit is then synchronized to a preamble (e.g., a 2T preamble) recorded on the disk (step 48) and the control circuitry searches for a second one of the servo sync marks (step 50). If a second one of the servo sync marks is not found, then it is assumed that the estimated servo zone is incorrect and the flow diagram is re-executed starting with initializing the timing circuit with a nominal center frequency (step 28).

Figure 4:
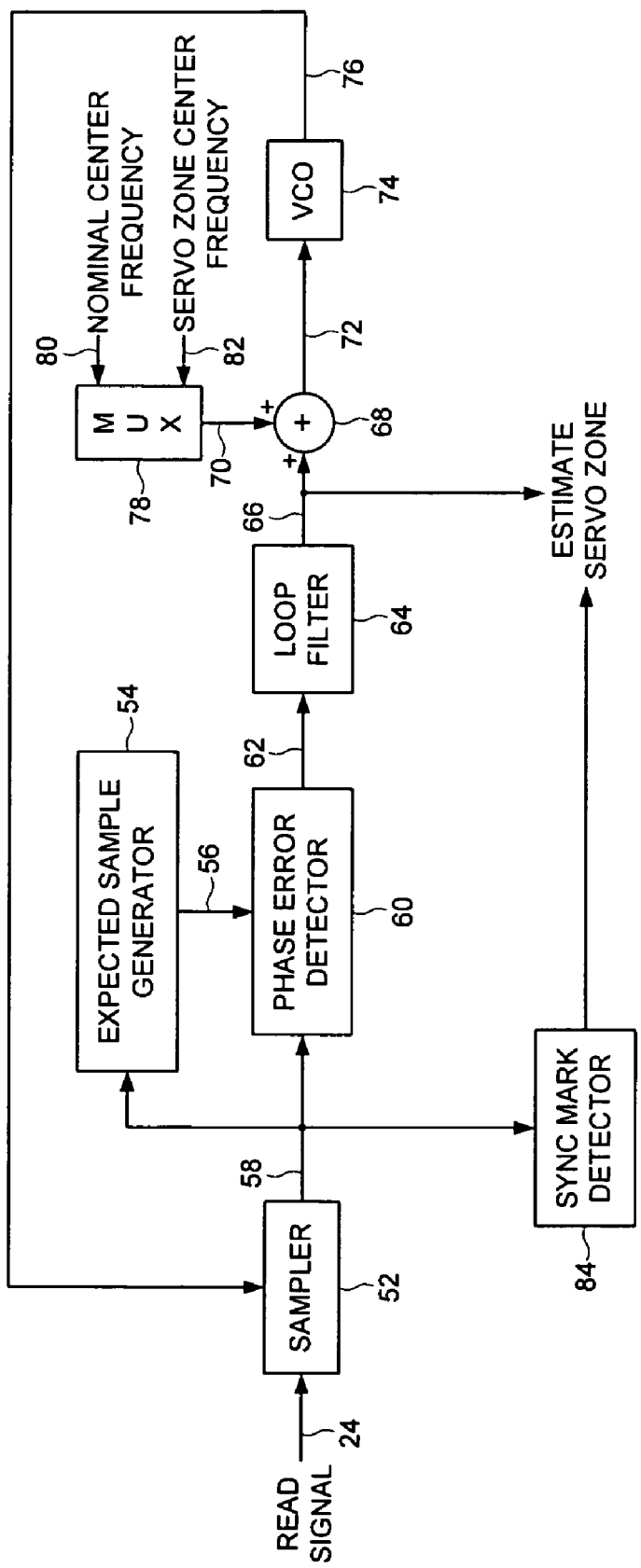
FIG. 4 shows a timing circuit implemented as a phase locked loop (PLL) according to an embodiment of the present invention including circuitry for estimating the servo zone.

Any suitable timing circuit may be employed in the embodiments of the present invention. FIG. 4 shows an example timing circuit comprising a phase locked loop (PLL) for synchronizing a sampling device 52 to the data rate of the read signal 24. An expected sample generator 54 generates expected samples 56 corresponding to a target response (e.g., a suitable partial response) relative to the read signal samples 58. A phase detector 60 generates a phase error 62 in response to the expected samples 56 and the read signal samples 58. The phase error 62 is filtered with a suitable compensation filter 64 to generate a control signal 66. The control signal 66 is added 68 to a center frequency 70 to generate a frequency control signal 72 for a voltage controlled oscillator (VCO) 74. The output 76 of the VCO 74 adjusts the frequency of the sampling device 52 until the read signal 24 is sampled synchronously.

When the servo zone is estimated, a multiplexer 78 selects a nominal center frequency 80 (step 28 of FIG. 3) that approximates an average servo data rate out of the plurality of servo zones. Eventually the PLL locks onto the frequency of the servo zone that the head is over, and once the servo zone has been identified, the multiplexer 78 selects a center frequency 82 corresponding to the estimated servo zone (step 46 of FIG. 3).

Any suitable technique may be employed to estimate the servo zone after detecting a servo sync mark. In an embodiment illustrated in FIG. 4, the control signal 66 of the PLL is used to estimate the servo zone. Once the PLL locks onto the frequency of the servo zone and a sync mark detector 84 detects the servo sync mark, the control signal 66 represents the offset from the nominal center frequency (the offset from the average data rate of all of the servo zones). In one embodiment, the servo zone center frequency 82 is generated as the frequency control signal 72 applied to the VCO 74 after the servo sync mark is detected. In another embodiment, the servo zone center frequency 82 is generated from a lookup table indexed by the control signal 66.

Other embodiments of the timing circuit may be employed in the embodiments of the present invention, such as an interpolating timing recovery circuit. With interpolated timing recovery, the read signal is sampled asynchronously and the asynchronous read signal samples are interpolated using an interpolation filter to generate the synchronous read signal samples. In one embodiment, the interpolating timing recovery circuit generates a phase error that is filtered to generate a control signal representing the frequency difference between the data rate of the read signal and the sampling frequency, and therefore provides an estimate of the servo zone.

Figure 5:
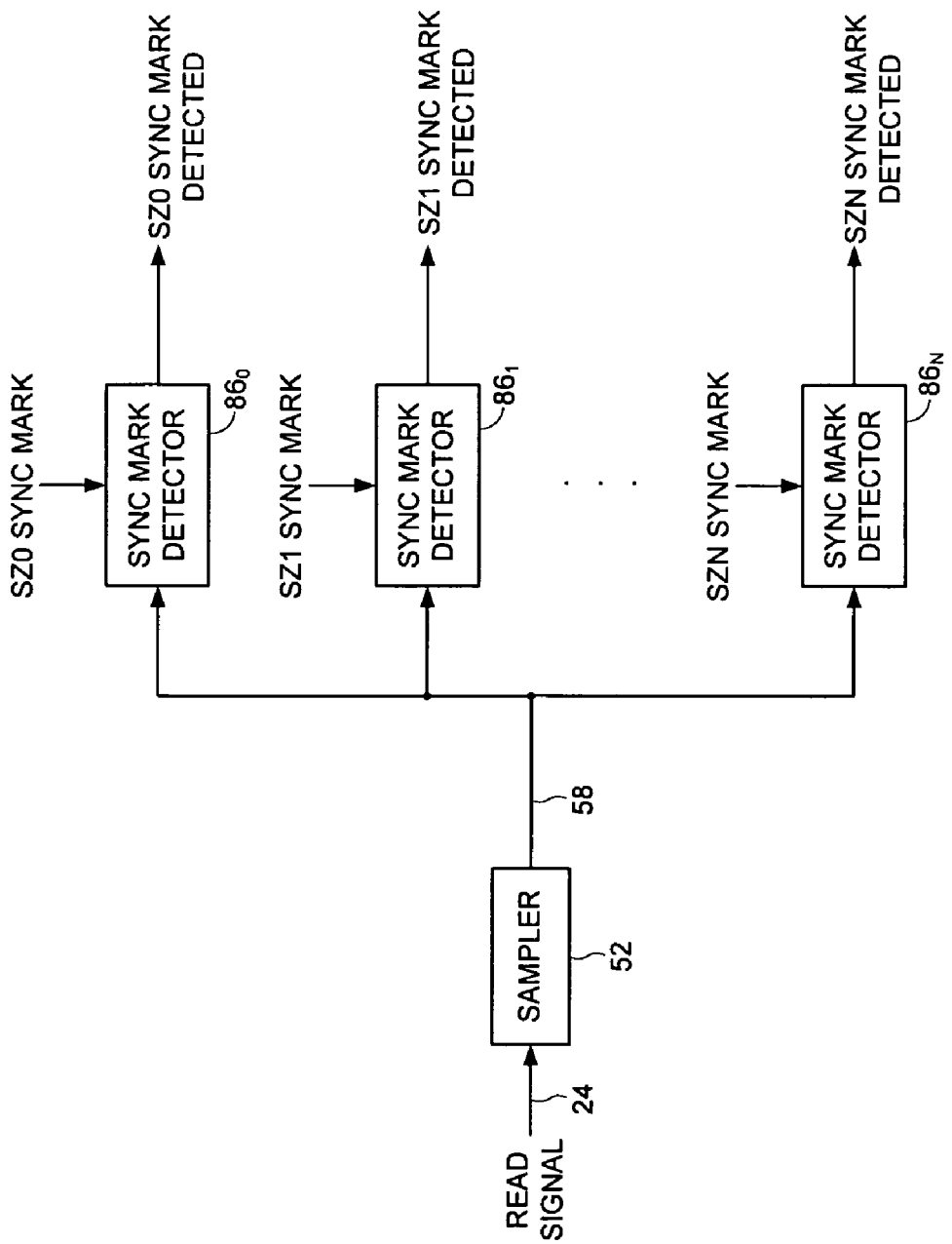
FIG. 5 shows control circuitry according to an embodiment of the present invention wherein the servo zone is estimated relative to a unique servo sync mark recorded in each servo zone.

FIG. 5 shows control circuitry according to an alternative embodiment for detecting the servo zone by recording a unique servo sync mark in the servo sectors of each servo zone. A plurality of sync mark detectors $86_0$-$86_N$ process the read signal samples 58 to detect the respective servo sync marks (SZ0-SZN). The output of the sync mark detectors $86_0$-$86_N$ are then processed (e.g., using a suitable encoder) to estimate the servo zone. The sync mark detectors $86_0$-$86_N$ may be implemented in any suitable manner, such as comparing the read signal samples to expected samples of a servo sync mark, or by estimating a data sequence from the read signal samples and comparing the estimated data sequence to an expected data sequence of the servo sync mark.

Figure 6:
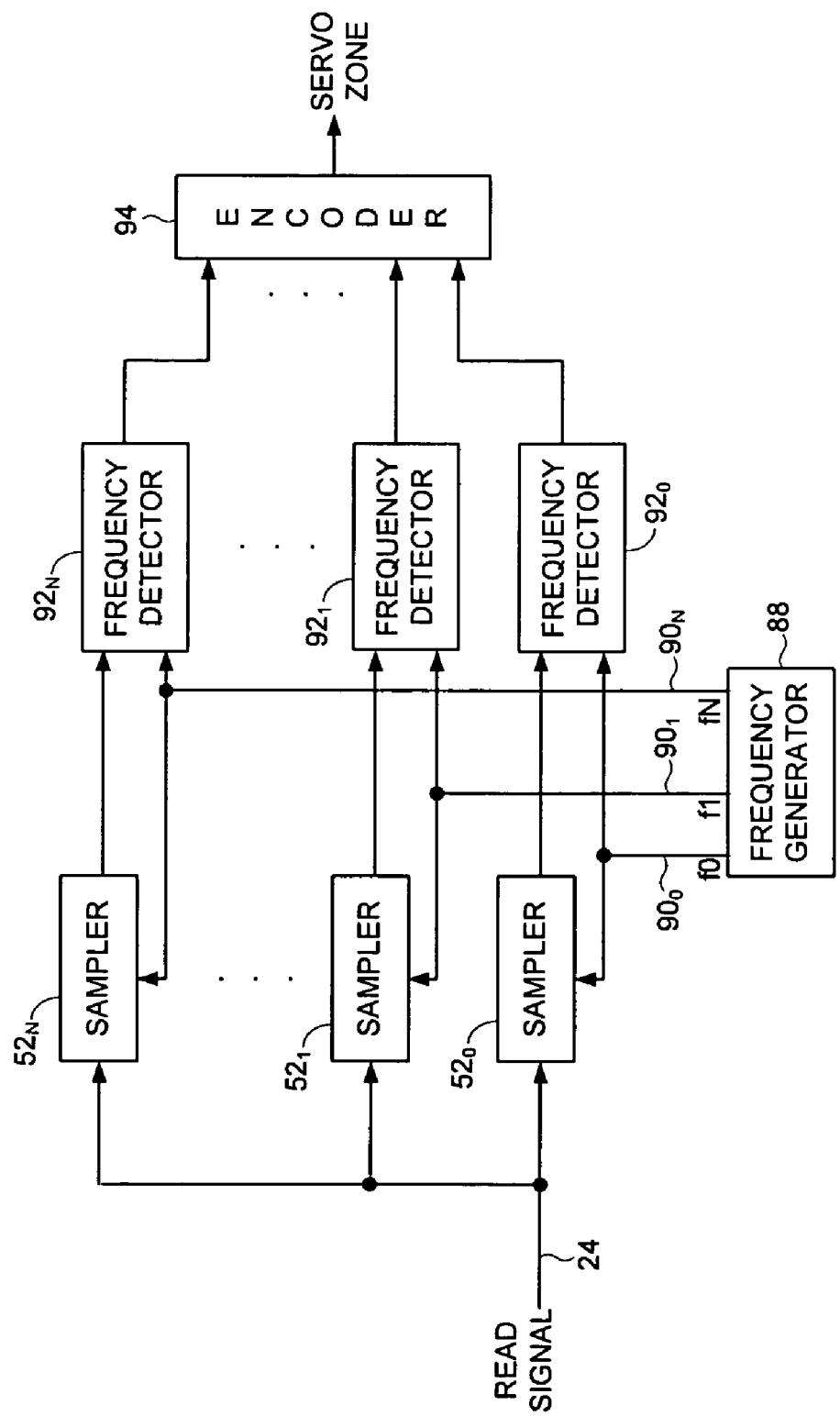
FIG. 6 shows control circuitry according to an embodiment of the present invention wherein the servo zone is estimated using a plurality of frequency detectors for detecting the servo data rate of a corresponding servo zone.

FIG. 6 shows control circuitry according to yet another embodiment for estimating the servo zone after detecting the servo sync mark. In this embodiment, a frequency generator 88 generates a plurality of clock signals $90_0$-$90_N$ each corresponding to the data rate of a respective servo zone. The read signal 24 is sampled $52_0$-$52_N$ at each frequency by the clock signals $90_0$-$90_N$, and the read signal samples are evaluated by a plurality of respective frequency detectors $92_0$-$92_N$ (which are also clocked by the respective clock signals $90_0$-$90_N$). Each frequency detector $92_0$-$92_N$ detects whether the frequency of the read signal samples matches the data rate of the respective servo zone, wherein the frequency detectors $92_0$-$92_N$ may be implemented in any suitable manner. In one embodiment, each frequency detector $92_0$-$92_N$ sums a predetermined number of read signal samples (such as summing the odd or even sample values). If the data rate of the read signal samples substantially matches the corresponding frequency of the frequency detector $92_0$-$92_N$, then the sum will be substantially zero when reading the preamble of a servo sector. Alternatively, or in addition to generating the sum, the frequency detectors $92_0$-$92_N$ may generate the square root of the squared odd samples plus the squared even samples. This value will exceed a threshold if the data rate of the read signal samples substantially matches the corresponding frequency of the frequency detector $92_0$-$92_N$ when reading the preamble of a servo sector. The outputs of the frequency detectors $92_0$-$92_N$ are processed in any suitable manner (e.g., using an encoder 94) to generate the estimated servo zone. In one embodiment, the read signal samples input into the frequency detectors $92_0$-$92_N$ are delayed to ensure that the read signal samples that are evaluated when the servo sync mark is detected correspond to the preamble preceding the servo sync mark.

Any suitable control circuitry 26 may be employed in the embodiments of the present invention, such as any suitable integrated circuit or circuits. For example, the control circuitry 26 may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry 26 comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk 16 and read into a volatile semiconductor memory when the disk drive is powered on. In yet another embodiment, the control circuitry 26 comprises suitable logic circuitry, such as state machine circuitry.

What is claimed is:

1. A disk drive comprising:
    a disk comprising a plurality of servo sectors defining a plurality of servo tracks, wherein:
        each servo sector comprises a servo sync mark;
        the servo tracks form a plurality of servo zones; and
        a servo data rate of the servo sectors in a first servo zone is different than a servo data rate of the servo sectors in a second servo zone;
    a head actuated radially over the disk for generating a read signal; and control circuitry operable to:
        (a) initialize a timing circuit with a nominal center frequency that approximates an average servo data rate out of the plurality of servo zones;
        (b) synchronize the timing circuit to the read signal to generate synchronous read signal samples;
        (c) detect a first one of the servo sync marks from the synchronous read signal samples; and
        (d) estimate which servo zone the head is reading after detecting the first servo sync mark.

2. The disk drive as recited in claim 1, wherein the control circuitry is further operable to adjust a servo timing window for activating a servo gate as the head approaches one of the servo sectors.

3. The disk drive as recited in claim 1, wherein the control circuitry is further operable to initialize the timing circuit with a servo zone center frequency corresponding to the estimated servo zone.

4. The disk drive as recited in claim 3, wherein the control circuitry is further operable to search for a second one of the servo sync marks after initializing the timing circuit with the servo zone center frequency.

5. The disk drive as recited in claim 4, wherein if the second servo sync mark is not detected, the control circuitry is further operable to re-execute elements (a) through (d).

6. The disk drive as recited in claim 1, wherein the control circuitry evaluates a timing circuit signal representing a servo data rate of the synchronous read signal samples to estimate the servo zone.

7. The disk drive as recited in claim 6, wherein the timing circuit comprises a phase-locked loop (PLL) and the timing circuit signal comprises a control signal of the PLL.

8. The disk drive as recited in claim 6, wherein the timing circuit comprises a plurality of frequency detectors and the timing circuit signal is generated in response to the frequency detectors.

9. The disk drive as recited in claim 1, wherein:
    the servo sync mark of the first servo zone is different than the servo sync mark of the second servo zone; and
    the control circuitry estimates the servo zone relative to which servo sync mark is detected.

10. A method of operating a disk drive, the disk drive comprising a disk comprising a plurality of servo sectors defining a plurality of servo tracks, wherein:
    each servo sector comprises a servo sync mark;
    the servo tracks form a plurality of servo zones; and
    a servo data rate of the servo sectors in a first servo zone is different than a servo data rate of the servo sectors in a second servo zone;
    the disk drive further comprising a head actuated radially over the disk for generating a read signal, the method comprising:
        (a) initializing a timing circuit with a nominal center frequency that approximates an average servo data rate out of the plurality of servo zones;
        (b) synchronizing the timing circuit to the read signal to generate synchronous read signal samples;
        (c) detecting a first one of the servo sync marks from the synchronous read signal samples; and
        (d) estimating which servo zone the head is reading after detecting the first servo sync mark.

11. The method as recited in claim 10, further comprising adjusting a servo timing window for activating a servo gate as the head approaches one of the servo sectors.

12. The method as recited in claim 10, further comprising initializing the timing circuit with a servo zone center frequency corresponding to the estimated servo zone.

13. The method as recited in claim 12, further comprising searching for a second one of the servo sync marks after initializing the timing circuit with the servo zone center frequency.

14. The method as recited in claim 13, wherein if the second servo sync mark is not detected, further comprising re-executing elements (a) through (d).

15. The method as recited in claim 10, further comprising evaluating a timing circuit signal representing a servo data rate of the synchronous read signal samples to estimate the servo zone.

16. The method as recited in claim 15, wherein the timing circuit signal comprises a control signal of a phase locked loop.

17. The method as recited in claim 15, wherein the timing circuit signal is generated in response to a plurality of frequency detectors.

18. The method as recited in claim 10, wherein:
    the servo sync mark of the first servo zone is different than the servo sync mark of the second servo zone; and
    the servo zone is estimated relative to which servo sync mark is detected.

19. A disk drive comprising:
    a disk comprising a plurality of servo sectors defining a plurality of servo tracks, wherein:
        each servo sector comprises a servo sync mark;
        the servo tracks form a plurality of servo zones; and
        a servo data rate of the servo sectors in a first servo zone is different than a servo data rate of the servo sectors in a second servo zone;
    a head actuated radially over the disk for generating a read signal; and
    a means for initializing a timing circuit with a nominal center frequency that approximates an average servo data rate out of the plurality of servo zones;
    a means for synchronizing the timing circuit to the read signal to generate synchronous read signal samples;
    a means for detecting a first one of the servo sync marks from the synchronous read signal samples; and
    a means for estimating which servo zone the head is reading after detecting the first servo sync mark.

* * * * *